Patented Dec. 6, 1932

1,889,831

UNITED STATES PATENT OFFICE

ERNST GUTZWILLER, OF BASEL, SWITZERLAND, ASSIGNOR TO THE FIRM OF CHEMICAL WORKS FORMERLY SANDOZ, OF BASEL, SWITZERLAND

MANUFACTURE OF ANTHRAQUINONE DERIVATIVES

No Drawing. Application filed March 14, 1929, Serial No. 347,178, and in Germany March 27, 1928.

It is known that the methylated diaminoanthrarufinmonosulphonic acids and diaminochrysazine monosulphonic acids, or their technical mixture are important acid dyestuffs, which are of a special value by their beautiful shade in the artificial light.

The manufacture of these products by sulphonation of the di-(methylamino)-dihydroxyanthraquinones in the usual manner has first been described in the German Patent Specification No. 125,576.

Another process has lately been described in the British Patent Specification No. 250,968, where the above mentioned monosulphonic acids are obtained from the disulphonic acids by eliminating one sulpho group by means of reducing agents.

On the other hand in the same specification a process for the preparation of methylated p-diaminoanthrarufin-2, 6-disulphonic acid, respectively p-diaminochrysazine-2, 7-disulphonic acid is mentioned, consisting in treating the free disulphonic acids in an aqueous solution with formaldehyde or an agent that yields formaldehyde.

It has now been found that di-(methylamino)-anthrarufinmonosulphonic acid, respectively chrysazinemonosulphonic acid can be produced by treating the monosulphonated p-diaminoanthrarufin and p-diaminochrysazine, respectively a mixture of the two isomers, in form of their purified alkali salts, in an aqueous solution or suspension containing a small quantity of mineral acid, with formaldehyde and agents that yield formaldehyde, in general with any formaldehydic agent.

The new process is illustrated by the following example, the parts being by weight.

Example 60 parts of the technical mixture of diaminoanthrarufinmonosulphonic acid and diaminochrysazine monosulphonic acid in form of their purified sodium salts of the formulae

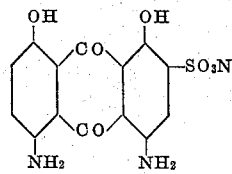 and 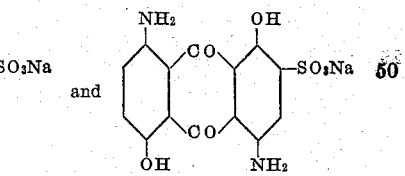

are stirred with 880 parts of water, 46 parts of formaldehyde of 37 per cent. strength (3½ molecular proportions) and 8.5 parts of sulphuric acid of 95 per cent. strength for 15 hours at 65° C. The methyl derivative formed is salted out in the usual manner.

It has been found that a great excess of formaldehyde influences the reaction in an injurious manner by partially splitting off the sulphonic group. Likewise a considerable excess of sulphuric acid must be avoided.

Instead of sulphuric acid other mineral acids in equivalent quantities, such as hydrochloric acid, may also be employed. The formaldehyde may be replaced by substances giving rise to formaldehyde, such as for example paraformaldehyde.

The improved process is also applicable to any dihydroxydiaminoanthraquinone monosulphonic acid, thus for example to the one or the other constituent alone of the mixture above referred to in form of its sodium salt.

What I claim is:

1. A process for the manufacture of methylated dihydroxydiaminoanthraquinonemonosulphonic acids, consisting in heating dihydroxydiaminoanthraquinone-monosulphonic acids in form of their alkalimetal salts to 50–100° C. for 10–20 hours in presence of small quantities of a mineral acid with formaldehyde and agents yielding formaldehyde.

2. A process for the manufacture of methylated dihydroxydiaminoanthraquinonemonosulphonic acids, consisting in heating a technical mixture of p-diaminoanthrarufinmonosulphonic acid and chrysazinemonosulphonic acid in form of their alkalimetal salts to 50–100° C. for 10–20 hours in presence of small quantities of a mineral acid with formaldehyde and agents yielding formaldehyde.

3. A process for the manufacture of methylated di-hydroxydiaminoanthraquinone-monosulphonic acids, consisting in heating aqueous solutions of a technical mixture of p-diaminoanthrarufinmonosulphonic acid and chrysazinemonosulphonic acid in form of their alkalimetal salts to 50–100° C. for 10–20 hours in presence of small quantities of a mineral acid with formaldehyde and agents yielding formaldehyde.

In witness whereof I have hereunto signed my name this 2nd day of March, 1929.

ERNST GUTZWILLER.